United States Patent
Nagel (10) Patent No.: US 9,007,467 B2
(45) Date of Patent: Apr. 14, 2015

(54) METHOD FOR OPERATING AN IMAGE-PROCESSING DEVICE AND A CORRESPONDING IMAGE-PROCESSING DEVICE

(71) Applicant: Uwe Nagel, Karlsruhe (DE)

(72) Inventor: Uwe Nagel, Karlsruhe (DE)

(73) Assignee: Eizo GmbH (DE)

( * ) Notice: Subject to any disclaimer, the term of this patent is extended or adjusted under 35 U.S.C. 154(b) by 243 days.

(21) Appl. No.: 13/668,590

(22) Filed: Nov. 5, 2012

(65) Prior Publication Data

US 2013/0113953 A1  May 9, 2013

(30) Foreign Application Priority Data

Nov. 4, 2011 (DE) .......................... 10 2011 117 654

(51) Int. Cl.
| | |
|---|---|
| H04N 17/00 | (2006.01) |
| H04N 17/02 | (2006.01) |
| H04N 5/225 | (2006.01) |
| H04B 3/46 | (2006.01) |
| H04B 17/00 | (2006.01) |
| H04Q 1/20 | (2006.01) |
| H04N 7/18 | (2006.01) |
| H04N 5/21 | (2006.01) |

(52) U.S. Cl.
CPC . *H04N 7/183* (2013.01); *H04N 5/21* (2013.01)

(58) Field of Classification Search
USPC ............... 348/207.99–207.2, 211.99–211.14, 348/222.1, 239, 241; 370/498–519; 375/224–228; 382/232–253; 713/189–194; 714/712–717
See application file for complete search history.

(56) References Cited

U.S. PATENT DOCUMENTS

| | | | | |
|---|---|---|---|---|
| 4,581,639 | A * | 4/1986 | Judge ............................ | 348/192 |
| 4,710,969 | A | 12/1987 | Fluck, Jr. et al. | |
| 5,473,361 | A * | 12/1995 | Penney ......................... | 725/143 |
| 5,499,294 | A * | 3/1996 | Friedman ..................... | 713/179 |
| 6,269,482 | B1 * | 7/2001 | Gershfeld ..................... | 725/107 |
| 6,396,961 | B1 * | 5/2002 | Wixson et al. ................ | 382/294 |
| 6,469,733 | B2 * | 10/2002 | Chong et al. ................ | 348/14.08 |
| 6,920,179 | B1 * | 7/2005 | Anand et al. ............ | 375/240.26 |
| 7,139,407 | B2 * | 11/2006 | Wakao .......................... | 382/100 |
| 8,351,644 | B2 * | 1/2013 | Guo et al. ..................... | 382/100 |
| 8,660,328 | B2 * | 2/2014 | Jarisch ......................... | 382/131 |
| 2002/0024588 | A1 * | 2/2002 | Chong et al. ................ | 348/14.01 |
| 2002/0114454 | A1 * | 8/2002 | Hamilton ...................... | 380/200 |
| 2003/0123700 | A1 * | 7/2003 | Wakao .......................... | 382/100 |
| 2005/0110907 | A1 * | 5/2005 | Jung ............................. | 348/701 |

(Continued)

FOREIGN PATENT DOCUMENTS

WO        WO 98/47118        10/1998

*Primary Examiner* — Michael Osinski (74) *Attorney, Agent, or Firm* — Ostrolenk Faber LLP (57) ABSTRACT

The invention pertains to a method for operating an image-processing device in which an image signal on which a noise signal is superimposed is digitally transmitted between a transmitter and at least one receiver, and in which the image signal comprises a timed sequence of images, each containing its own image content and a noise pattern of the noise signal superimposed on the image content. At least certain areas of at least two successive images of the image signal are compared to each other after the transmission, and if a difference is found between the noise patterns contained in the images, it is concluded that the images have been transmitted successfully even if the image content of the images is identical. The invention also pertains to an image-processing device for the digital transmission of an image signal on which a noise signal is superimposed.

16 Claims, 2 Drawing Sheets

(56) References Cited

U.S. PATENT DOCUMENTS

| | | | |
|---|---|---|---|
| 2005/0271298 A1* | 12/2005 | Yu | 382/286 |
| 2006/0232689 A1* | 10/2006 | Ito et al. | 348/241 |
| 2006/0285020 A1* | 12/2006 | Shin et al. | 348/701 |
| 2008/0094516 A1* | 4/2008 | Lim et al. | 348/646 |
| 2008/0107137 A1* | 5/2008 | Yasui | 370/516 |
| 2008/0175440 A1* | 7/2008 | Burns et al. | 382/107 |
| 2008/0285883 A1* | 11/2008 | Lee | 382/266 |
| 2008/0298709 A1* | 12/2008 | Lee | 382/264 |
| 2009/0052353 A1* | 2/2009 | D'Amico et al. | 370/280 |
| 2009/0060370 A1* | 3/2009 | Pedersen | 382/261 |
| 2009/0214112 A1* | 8/2009 | Borrey et al. | 382/167 |
| 2009/0291643 A1* | 11/2009 | Tsao | 455/67.13 |
| 2009/0315871 A1* | 12/2009 | Kobayashi | 345/208 |
| 2010/0135544 A1* | 6/2010 | Mattiuzzi et al. | 382/128 |
| 2010/0238190 A1* | 9/2010 | Ciurea et al. | 345/589 |
| 2013/0051482 A1* | 2/2013 | Nassar et al. | 375/257 |
| 2014/0075203 A1* | 3/2014 | Barbu et al. | 713/189 |

* cited by examiner

METHOD FOR OPERATING AN IMAGE-PROCESSING DEVICE AND A CORRESPONDING IMAGE-PROCESSING DEVICE

CROSS REFERENCE TO RELATED APPLICATION

The present application claims priority of German Patent Application No. 10 2011 117 654.7, filed Nov. 4, 2011, the entire contents of which are hereby incorporated by reference.

FIELD OF THE INVENTION

The invention pertains to a method for operating an image-processing device, in which an image signal on which a noise signal is superimposed is digitally transmitted between a transmitter and at least one receiver, and in which the image signal comprises a timed sequence of images, each of which contains its own image content and a noise pattern of the noise signal superimposed on the image content. The invention also pertains to an image-processing device.

BACKGROUND OF THE INVENTION

Methods of the type indicated above are known from the prior art. They are used for the operation of the image-processing device, which handles the transmission of the image signal between the transmitter and the receiver. The transmitter is connected to, for example, a recording device or a data-acquisition device, by means of which the image signal is acquired. The image signal consists of a timed sequence of images, which contain the image content recorded by the recording device. It is often impossible to prevent the occurrence of noise during the recording of the image content or image signal, which means that a noise pattern is superimposed on the image content. The noise pattern thus forms part of each image of the image signal even before the signal is transmitted. With respect to its sequence in time, the noise pattern correlates with, i.e., is contained in, the noise signal.

The transmission between the transmitter and the receiver proceeds in an exclusively digital manner, wherein compression can be carried out if desired. If the image signal is compressed before transmission, preferably a loss-free compression method is used Alternatively, however, a lossy compression method could also be used. The transmission takes place preferably over a transmission route consisting of a shielded cable or comprising an optical fiber. It is obvious, however, that the transmission route can be designed in any suitable way.

When the image signal is transmitted in analog form, any problem with the transmission route has a visible effect on the transmission quality, so that, when the image signal displayed on a display device is observed, an essentially reliable judgment can be made about whether or not the image transmission process has been successful or faulty. When the images are transmitted in digital form, however, the problem can occur that, even though the transmission route is severely compromised, the images can still be displayed in a manner which appears qualitatively unimpaired, such as when, for example, one of the successive images is repeated. This is the case especially when an image buffer is assigned to the receiver, from which one of the most recent successfully transmitted images can be reproduced again. When this happens, a static or "frozen" image results, which does not represent the current image content.

The method is used in particular for imaging systems in the medical area. In these systems, it is very important to know whether or not the image being shown at any particular moment on the display device is current, that is, whether it comprises the current image content acquired by the recording device, or whether the image reproduction chain has frozen as a result of, for example, a fault in the image transmission process. If, for example, a patient is being treated on the basis of the displayed image, and if the person performing the treatment assumes that the displayed image is current whereas in fact it is frozen and no longer current, the consequences can be serious, and in particular the patient can suffer injury.

SUMMARY OF THE INVENTION

It is therefore the goal of the invention to propose a method for operating an image-processing device which does not suffer from the disadvantages cited above but which instead makes it possible in particular to recognize reliably when image transmission is successful and when faulty and thus to recognize a frozen image.

In a method according to the present invention, after the transmission, at least certain areas of at least two successive images of the image signal are compared to each other, and if a difference is found between the noise patterns contained in the images, it is concluded that image transmission has been successful even if the image contents of the images are identical. The image signal is sent from the transmitter over the transmission route to the receiver. After the transmission, preferably immediately before the images are shown on the display device, at least certain parts of the two successive images of the image signal are compared to each other. If this comparison reveals a difference between the images or between the noise patterns contained in them, then it is possible to conclude that the images have been transmitted successfully. It is advantageous to extend the comparison to more than two successive images, which has the result of reducing the risk of an incorrect conclusion concerning successful or faulty image transmission and thus of increasing the accuracy of the conclusion. In a procedure such as this, therefore, at least three or more successive images are compared to each other.

Especially in the medical field it can occur that two successive images, especially immediately successive images, have the same image content, perhaps because the scene recorded by the recording device has not changed. A case such as this occurs frequently, for example, when images are recorded during an angiography without a contrast agent or in the case of x-ray imaging. When, in this case, the successive image contents of the images of the image signal are compared to each other, it is possible under certain conditions for no difference to be found if the scene has not changed, which means that—even if the images have been transmitted without error—it must be concluded that the image transmission has not been successful and that instead an error must be present.

For this reason, it is especially important in the inventive method for the noise patterns of the successive images which are compared to each other after they have been transmitted to be different even before they are transmitted. If this is so, the successive images will differ even though the image content is the same; in particular the noise patterns will be different. A difference will therefore be found when the comparison is made and the success of image transmission will be recognized. When the comparison is made, therefore, it is the noise patterns of the images being compared which will be of interest; the actual image content is essentially irrelevant, although it is obvious that it could also be used as basis for comparing the images. It can be advantageous to determine, even before the transmission, whether the image signal comprises the previously described properties, i.e., whether the successive images differ at least with respect to their noise pattern. This can be done, for example, by conducting the comparison described above additionally even before the images are transmitted. If no difference is found between the successive images, appropriate measures can be taken; for example, a noise pattern can be superimposed on the image contents of the images to be transmitted before transmission.

According to an elaboration of the invention, the comparison is carried out pixel-by-pixel, and the number of pixels in the images which are different is determined as a difference variable; or the pixel values of at least some of the pixels of an image are added up, and the difference between the sums obtained for successive images is determined as a difference variable. Each image is composed of multiple pixels, which can be organized basically in any desired way (in rows and columns, for example), wherein each pixel comprises at least one pixel value. The pixel value specifies—as a function of the color space being used—the color and/or the intensity with which the pixel is reproduced when shown on the display device.

The number of pixel values which must be provided differs as a function of the color depth of the image signal, i.e., of the images contained therein. A monochrome image, in particular a black-and-white image or a gray-scale image, usually comprises only one pixel value per pixel, wherein the pixel value can, however, have different resolutions. In the case of a black-and-white image, for example, a resolution of one bit per image value is sufficient (the color depth of the image signal is therefore 1 bit), whereas the pixel value of a gray-scale image has a resolution of greater than or equal to 8 bits and can be in particular 10, 12, or 16 bits. The pixel value for the gray-scale image specifies the intensity with which the corresponding pixel is reproduced on the display device. If the image is in color, several pixel values are assigned to each pixel; these values can again have different resolutions. For example, at least three pixel values are provided, this again depending on the color space being used, and each of these values has a resolution of at least 8 bits, especially of 10, 12, or 16 bits, to describe the intensities of the three basic colors red, green, and blue to be displayed.

The comparison of the successive images can be carried out in principle in any desired way. For example, a pixel-by-pixel comparison can be provided, wherein the number of pixels which are different between the images is determined and noted down as the difference variable. This means, therefore, that the pixels of the images which are compared with each other are in the same positions (that is, with the same indices) within the images. If a difference is found, the difference variable is increased by one. This procedure is carried out for at least some the pixels of the images, but in particular it is carried out for all of the pixels. On comparison of the pixels with each other, usually all of the pixel values of the corresponding pixels are compared with each other, and even if a difference is found in only a single pixel value, the difference variable, which is set back before the comparison, i.e., in particular set back to zero, is increased by one. Alternatively, of course, it is possible to evaluate and compare only certain individual pixel values, such as the pixel values assigned to a certain color.

Alternatively, the comparison can be carried out by adding up the pixel values of at least some of the pixels in each of the successive images and by determining the difference between the sums as the difference variable. It is therefore provided that the pixel values of pixels in the same positions within the images are added up for each of the images, from which a sum is obtained in each case as a result. These sums are compared with each other, and the difference between them is noted down as the difference variable. When the pixel values are being added up, as already discussed above, it is possible to take into account only certain pixel values, such as the pixel values assigned to a certain color. Preferably, however, all of the pixel values of the pixels under consideration are considered. The disadvantage of this approach, however, is that, statistically speaking, it is possible, even if differences are in fact present between the successive images, for the sums to be (almost) equal, as a result of which the images will be evaluated as (almost) identical.

According to an elaboration of the invention, it is concluded that the images are being transmitted successfully when the difference variable exceeds a constant threshold value. Whereas it is also obviously possible to conclude that the images have been transmitted successfully even if there is only a single difference or if the difference value between the compared images is greater than zero, it is advantageous to draw such a conclusion only when the threshold value is exceeded or reached. Errors can occur even during digital transmission such as that according to the DVI standard. The pixel error rate in this case is $10^{-9}$ for a good DVI signal with a resolution of 1280×1024 pixels, corresponding to a total of 1.3 million pixels per image. From this it can be derived that a pixel error resulting from transmission according to the DVI standard occurs once every 770 transmitted images. If the threshold value is set too low, a pixel error of this type can lead to a false conclusion of successful image transmission. Especially in the case of transmission routes in which interference can occur, it is therefore advantageous for the threshold value to be determined in such a way that no such false conclusions can be drawn. The threshold value is constant, i.e., is defined only once, and remains unchanged after that.

If the interference in the transmission route is strong, there can also be obvious interference in the image reproduced on the display device instead of simply a still frame. Although the user of the image-processing device will clearly see this interference for what it is and will therefore be able to conclude without outside help that the image transmission process has been unsuccessful, it is nevertheless advantageous to indicate this to him in these situations as well. For this reason, an additional, higher threshold value can be provided. If this is done, successful image transmission will be recognized only if the difference variable is between the two threshold values, wherein the threshold values themselves are usually included, i.e., considered part of the range of "successful" values. To allow the conclusion of successful image transmission to be drawn, therefore, the difference variable should be greater than or equal to the threshold variable but less than or equal to the additional threshold variable. If, conversely, it is below the threshold value or above the additional threshold value, the conclusion of faulty image transmission will be drawn. The additional threshold value will also preferably be defined only once and remain unchanged after that.

According to an elaboration of the invention, in cases where the difference variable falls below the constant threshold value, faulty image transmission is recognized in particular only when the successive images are identical. Whereas successful image transmission is present when the difference variable exceeds the constant threshold value, the reverse is also true, namely, a defect in image transmission has occurred when the difference value falls below the threshold. It would therefore be necessary in the latter case to draw the conclusion of faulty image transmission. In a special embodiment, therefore, it is provided that faulty image transmission is determined only when the images are identical. Even one difference in one of the pixels, especially in one of the pixel values of the pixel, is therefore enough to avoid the determination of faulty image transmission and instead to conclude that image transmission has been successful. In an embodiment such as this, the threshold value is therefore set effectively to zero.

According to an elaboration of the invention, the transmitter accepts a digital input signal as the image signal, or the transmitter accepts an analog input signal and digitizes it into the image signal. The input signal is made available to the transmitter via an input terminal. If the input signal is in digital form, the transmitter can accept the input signal directly as the image signal and transmit it to the receiver over the transmission route. If an analog signal is provided, the transmitter has an analog/digital converter, which converts the analog input signal into the digital image signal. Then the digital image signal is transmitted by the transmitter to the receiver.

According to an elaboration of the invention, the noise signal arises during the recording of the image signal by a recording device, and it is sent together with the image signal to the transmitter. The image signal is therefore never separate from the noise signal; on the contrary, the noise signal is superimposed on the image signal directly during the recording of the image content by the recording device, which is to say that the noise signal is generated by the recording device. The noise signal is thus to this extent present in the form of image noise. By this we mean the deterioration of the image recorded by the recording device as a result of interference which is not related in any way to the recorded image content. Instead, the noise pattern of the noise signal is superimposed on the image content in such a way that the pixels of the image deviate with respect to color and/or brightness from the pixels actually present in the recorded scene. The recording device is, for example, the digital imager of an x-ray machine, which comprises ananalog/digital converter, especially in the form of a CCD or CMOS sensor, which converts the scene into the image content. In such converters, image noise always occurs on principle, which means that the noise signal is an unavoidable component of the image.

Image noise can arise in different ways, but usually it is present for the most part in the form of dark noise and/or read-out noise. These types of noise usually occur as a result of overamplification during the readout of a sensor, which is exposed only to light of low intensity. The recording device is therefore usually a digital recording device, which detects the scene to be recorded by means of a sensor in the form of a CCD or CMOS sensor and thus records the image content. The noise pattern is superimposed on the image content, as explained above, so that the image signal sent to the transmitter already has the noise signal superimposed on it; the transmitter thus accepts both the image and noise signals together. Quantum noise and/or thermal noise can also occur, either additionally or alternatively. The former limits the recognizability of small or low-contrast structures of the image content, especially in the case of the images produced by x-ray machines. The latter occurs as a function of the temperature of the sensor, wherein usually the intensity of the noise increases with increasing temperature.

According to an elaboration of the invention, the transmitter superimposes the noise signal on the image signal with a certain intensity, in particular a selectable intensity, an intensity calibrated to the image signal, and/or an intensity which is random within certain limits. This is advantageous especially in cases where the noise signal has not yet been superimposed on the image signal, that is, on the input signal, being sent to the transmitter, or in cases where the noise signal superimposed on the image signal is not strong enough to guarantee a reliable conclusion about the success of the image transmission process. This can be the case when the input signal is reproduced or repeated from a preferably digital image buffer. Here the noise patterns of successive images are the same, so that it would be concluded erroneously that the image transmission was faulty. When the input signal is generated digitally, however, there is not yet any noise signal present at all.

For this reason, the transmitter should in these cases add the noise signal to the image signal, i.e., superimpose it on the image signal. A noise signal which might already be present under certain conditions but which is of insufficient intensity, as mentioned above, is replaced by the noise signal provided here, i.e., the added noise signal is superimposed on it. The intensity of the noise signal determines in particular how many of the pixels of the image in question are to be changed by the noise signal and/or how strong the effect of the noise signal on the pixel in question should be. The intensity therefore describes to this extent the difference value, which, as a result of the noise, is added to the pixel value of the corresponding pixel or is subtracted from it.

If the noise signal is superimposed on the image signal in the transmitter, then it is useful to make the intensity variable, so that the interference with the image can be kept as small as possible without impairing the ability to arrive at a reliable conclusion about the success or failure of the image transmission process. For this reason, the intensity can be selectable, for example, which means that it can be defined or set by the user.

It can also be calibrated automatically to the image signal, so that, for example, in the case of pixel values which are small in an absolute sense, the intensity of the superimposed noise signal will also be lower, whereas the intensity will be higher in the case of pixel values which are large in the absolute sense.

In addition or alternatively, the intensity can also be set randomly. It is preferable in this case to set the intensity randomly a single time, namely, at the beginning of the transmission. It is also possible, however, to set the intensity randomly at certain intervals, in particular for each image to be transmitted. The randomly determined intensity should remain within the determined limits, so that it does not fall below a certain minimum intensity and does not exceed a certain maximum intensity. In this way, through appropriate choice of the minimum intensity, the intensity can always be set high enough to make it possible to draw a reliable conclusion about the successful or faulty nature of the image transmission; and on the other hand, through appropriate choice of the maximum intensity, the intensity can be limited in such a way that the image content of the image is not distorted to the point of unrecognizability by the noise or noise pattern.

According to an elaboration of the invention, the noise signal is superimposed on the image signal in at least one specific pixel, which in particular is specified randomly. This is done preferably in cases where the noise signal is superimposed on the image signal in the transmitter. It is therefore possible for only a single pixel to be affected by the noise, wherein, in this case, it is advisable for the intensity of the noise signal to be different for each transmitted image to ensure that it is possible to determine reliably whether or not the image transmission has been successful. Preferably, however, several pixels are affected by the noise signal. It is advantageous to determine the specific pixel or the specific pixels randomly; they therefore change from one image to the next, which means that the affected pixels of one image are always different from those of the next. If several pixels are affected, then it is advisable for these not to be immediately adjacent to each other. Nevertheless, this can obviously be true for at least some of the images in cases where the pixels to be affected are selected randomly.

According to an elaboration of the invention, when the noise signal is superimposed on the image signal, at least one pixel value of at least one pixel, preferably of all pixels, is increased by a certain value in the first image of the sequence of images of the image signal and decreased by the same value in the second, subsequent image. In this case, the noise signal or noise pattern does not represent random noise but rather a controlled change in the image signal. This approach is used preferably for images which follow each other immediately. The pixel value of the pixel in the first image is increased by a certain value and decreased by the same value in the second image immediately following the first. Preferably all of the pixel values of the pixel are modified in this way. In this case, the noise pattern therefore comprises the specific value by which the pixels are changed, which alternates between a positive sign and a negative sign.

Because the images of the image signal are usually reproduced on the display device at a display frequency which is faster than the ability of the human eye to resolve, the user does not perceive the modifications of the pixel values. Instead, they appear to him in an averaged-out form, so that he perceives only the original image content, not the noise pattern superimposed on the image content. When the values are being increased and decreased by the certain specific value, preferably care should be taken to ensure that no overrun of the pixel value can occur. This means that, if the increase by the certain specific value would cause the pixel value to exceed a maximum pixel value or that if decrease would cause it to fall below a minimum pixel value, the associated increase or decrease will not be performed. This prevents the image content from becoming falsified. Alternatively, the image content of the images can be adapted prior to the modification in such a way that the noise pattern can be superimposed on the image content without the occurrence of any such overruns.

According to an elaboration of the invention, after the comparison and before the display on a display device, the pixel value for the first of the successive images is decreased by a certain value and increased for the second image. This procedure is used when the procedure just described above is used, namely, that of increasing and decreasing the pixel value by a certain value. In this case, there is no need to worry about an overrun when increasing or decreasing the value. Instead, if there should be an overrun, it is cancelled out again by the following decrease or increase and by the new overrun thus caused.

The increase and decrease performed in the transmitter and the decrease and increase performed in the receiver are carried out synchronously. This means that, for each image in which the pixel values have been increased by the certain value, the pixel values are now decreased by that same value or vice versa.

According to an elaboration of the invention, the image signal comprises a certain image frequency prior to transmission and is transmitted at a transmission frequency which is greater than the image frequency, for which purpose at least one image of the image signal is transmitted multiple times from an image buffer. This procedure is used especially in cases where the recording device is an image sensor of a medical device such as an x-ray machine. A sensor of this type often acquires the image content at a low recording frequency, often a whole-number divisor of the display frequency of, for example, 60 Hz. The recording frequency is, for example, 10, 15, or 30 Hz. The transmission of the image signal is usually carried out at a transmission frequency corresponding to the display frequency. To bring the frequency up to the required display frequency for display on the display device, the recorded images or image contents are often repeated prior to transmission.

For this purpose, the image is transmitted multiple times from the image buffer. The image buffer can be, for example, a digital image buffer. In a procedure of this type, the image contents of successive images correspond to each other, but in addition—as a result of the repetition from the image buffer—any noise patterns recorded along with the image contents correspond also. For this reason, it is advisable for the noise signal to be superimposed on the image signal in the transmitter, just prior to transmission, in order to avoid a false detection of faulty image transmission.

According to an elaboration of the invention, either the images compared to each other follow each other immediately or there are a certain number of intermediate images between them. The images of the image signal occur one after the other in time-sequential order. It is now to be provided that the images compared to each other after transmission are images which follow each other immediately in time; that is, there are no intermediate images recorded or transmitted between them. Alternatively, however, it is also possible for a certain number of intermediate images to be present between the compared images; that is, the compared images therefore do not follow each other immediately. Thus, if the image of the image signal is transmitted multiple times from the image buffer, it is possible to avoid a false detection of faulty image transmission by selecting the number of intermediate images in such a way that the images compared to each other are always those which, in the case of a successful image transmission, potentially comprise different image contents.

According to an elaboration of the invention, the success of image transmission and/or the faulty nature of that transmission is displayed to the user of the receiver and/or, upon recognition of faulty image transmission, the display on the display device is stopped. This is intended to inform the user that image transmission has been successful or faulty. For this purpose, something appropriate is shown on the display device; a symbol in an appropriate color, for example, can be superimposed on the display. This can be done in such a way that, for example, the symbol appears on top of at least a small portion of the image content; this is especially appropriate in the event of an error. In addition or as an alternative, the display on the display device can be stopped as soon as faulty transmission has been recognized. This can be done in particular in such a way that a monochromatic image such as a completely black or completely white screen is displayed on the display device.

It can also be provided that the symbol indicating faulty image transmission does not appear until after several such faulty transmissions have occurred. The user is therefore not informed about faulty image transmission after only the first such error. Instead, the number of faulty image transmissions must first exceed a certain limit. This limit is specified in such a way that, although multiple occurrence of faulty image transmissions is allowed, the user has sufficient opportunity to react appropriately in real time to the error after the symbol indicating faulty image transmission has appeared.

The invention also pertains to an image-processing device especially for implementing the method according to the description above, wherein the image-processing device has a transmitter and at least one receiver, which are designed for the digital transmission of an image signal on which a noise signal is superimposed, and wherein the image signal comprises a timed sequence of images, each with its own image content and a noise pattern of the noise signal superimposed on the image content. The purpose of the image-processing device is to compare, after the transmission, at least certain areas of at least two successive images of the image signal, and, if a difference is found between the noise patterns contained in the images, to conclude that image transmission has been successful even if the image contents are identical. The image-processing device can be elaborated in accordance with the descriptions given above.

The invention is explained in greater detail in the following on the basis of the exemplary embodiments illustrated in the drawings, which are not intended to impose any limitation on the invention:

DETAILED DESCRIPTION OF THE EMBODIMENTS OF THE INVENTION

Figure 1:
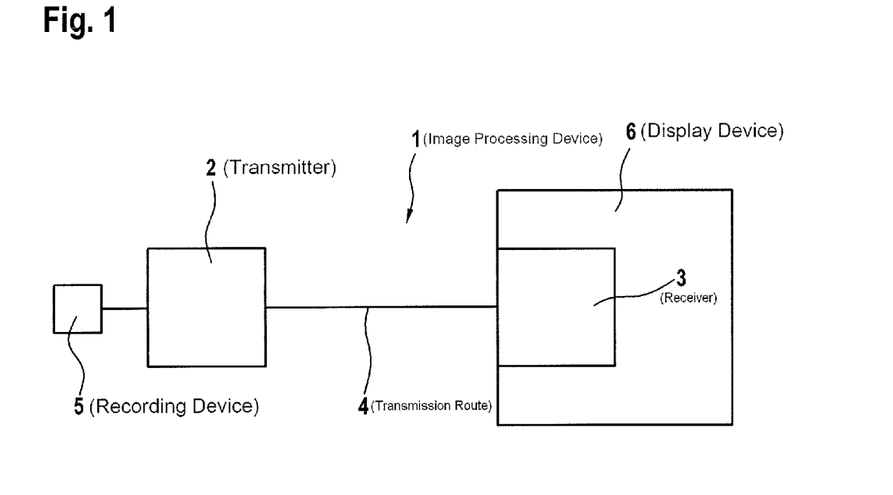
FIG. 1 is a schematic diagram of an image-processing device for digitally transmitting an image signal on which a noise signal is superimposed.

FIG. 1 shows an image-processing device 1. Among other components, the image-processing device 1 consists of a transmitter 2 and a receiver 3. These are connected to each other by a transmission route 4, usually a shielded cable, and are set up for the digital transmission of an image signal on which a noise signal is superimposed. A recording device 5 of the image-processing device 1 is connected to the transmitter 2. Alternatively, the transmitter 2 can be designed as an integral part of the recording device 5. The latter serves to record a scene and to generate images in an image sequence at a certain recording frequency, which it supplies as an input signal to the transmitter 2. The transmitter 2 accepts the input signal as an image signal, or—if the signal is in analog form—the transmitter digitizes it into the image signal. The receiver 3 is integrated into a display device 6. This eliminates the need for an additional external cable to transmit the image signal from the one to the other. The images of the image signal are transmitted between the transmitter 2 and the receiver 3 at a transmission frequency which is expressed in images per unit time. The display device 6 reproduces the transmitted images at a display frequency which is preferably the same as the transmission frequency. Both the transmitter 2 and the receiver 3 usually have their own digital image buffers (not shown here).

The transmitter 2 and/or the recording device 5 can comprise means for image processing. These can, for example, modify at least one of the images as soon as it has been recorded or before it has been transmitted over the transmission route 4. Preferably all of the recorded or transmitted images are modified. For example, the processing means can be used to adjust the contrast of the image content of the images and/or to adjust the color depth. The latter option is used in particular in cases where the images of the image sequence are recorded at a considerable color depth of, for example, 16 bits, whereas the images are displayed at a lower color depth of only 8 bits, for example. To reduce the amount of data to be transmitted, it is therefore provided that, immediately after the recording or at least prior to transmission, the color depth is reduced by the image-processing means. In principle, however, the images can be modified in any desired way.

Figure 2:
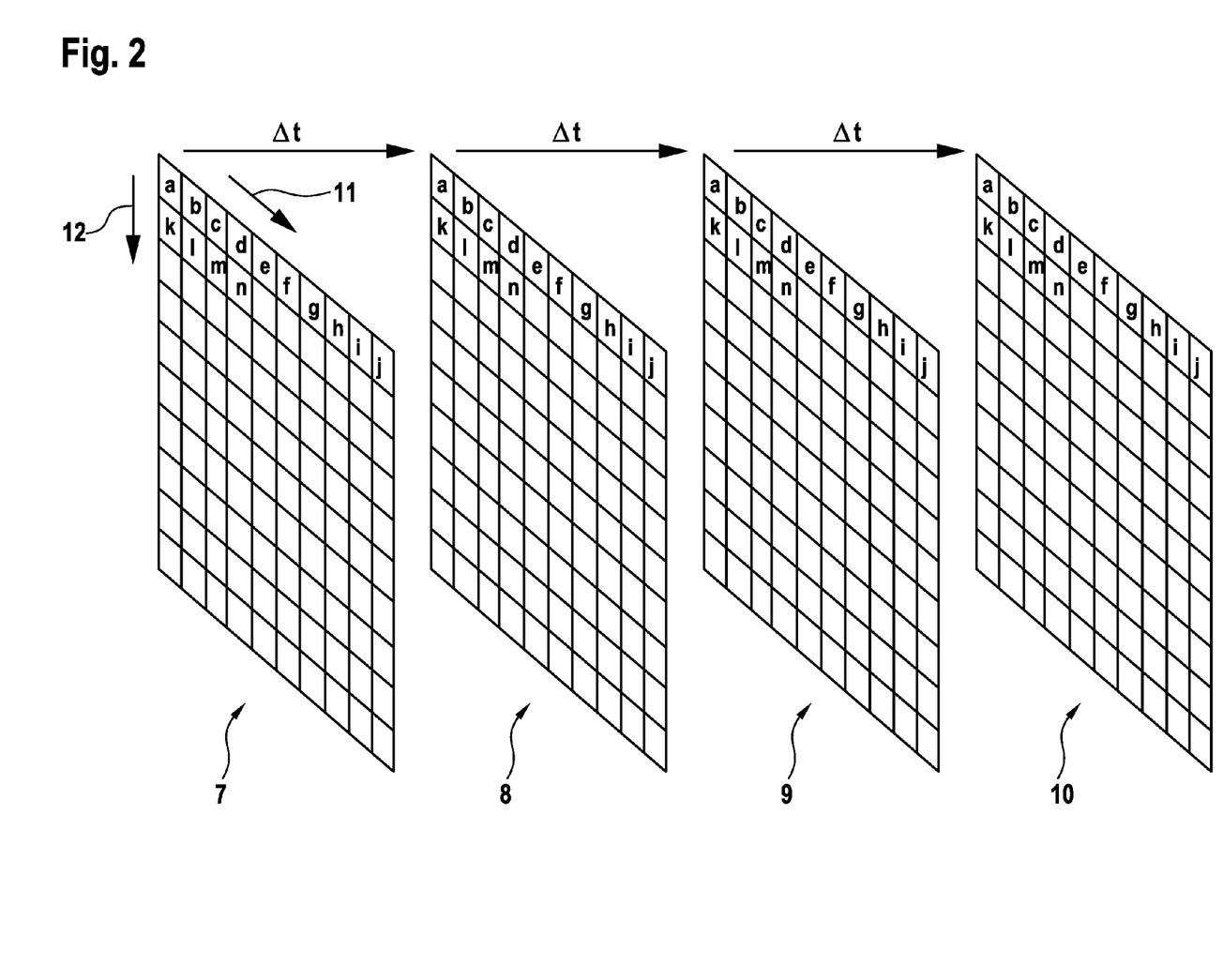
FIG. 2 is a schematic diagram of the image signal, which consists of a timed sequence of images, which are composed of image content and a noise pattern.

The image signal transmitted by the transmitter 2 to the receiver 3 is composed of a timed sequence of images 7, 8, 9, 10, which are illustrated in FIG. 2 generically and purely by way of example. It is obvious that the image signal diagrammed here is given only for the sake of illustration and that basically it can comprise any number of images. Images 7-10 contained in the image signal are separated from each other by a time interval $\Delta t$ and comprise a plurality of pixels, only a few of which are identified here, for example, by the reference letters a-n in combination with their positions within the images 7-10. The pixels a-n are organized, for example, in columns (arrow 11) and rows (arrow 12).

Each pixel a-n has at least one pixel value, which describes how the image 7-10 in question will be reproduced on the display device 6. In the case of a gray-scale image, each pixel a-n usually comprises only a single pixel value, which can have any desired resolution. Standard resolutions are, for example, 8 bits, 10 bits, 12 bits, and 16 bits. In the case of a color image, each pixel a-n usually comprises several, in particular three, pixel values. Each pixel value can be assigned to a certain color or color intensity. It is standard practice to assign to each pixel one pixel value for each of the colors red, green, and blue.

Images 7-10 of the image signal are composed of the image content and a noise pattern. The image content corresponds essentially to the scene recorded by the recording device 5, that is, to the conversion of the scene into electronic form, especially under consideration of the color space. The noise pattern can also arise during the recording process, but this is not necessarily always the case. The noise pattern is a component of the noise signal, which is superimposed on the image signal before transmission over the transmission route 4. If the noise pattern has already arisen during the recording process, its cause is usually the dark noise or recording noise of the recording device 5. This device has, for example, a CCD or CMOS sensor (not shown separately), which supplies a digital input signal to the transmitter 2 at a recording frequency (images per unit time).

What is implied by the superimposition of a noise pattern on the image content is that the noise pattern causes the image content to deviate from the original scene recorded by the recording device 5. The noise pattern thus does not replace the pixel values a-n but rather preferably merely modifies them. For example, the noise pattern can also be organized into pixels or pixel values like the images 7-10 or their image contents. The noise pattern, however, preferably specifies only relative values by which the images 7-10 are modified prior to transmission; this can involve, for example, the addition of the relative values to the pixel values of the pixels of the image contents of images 7-10.

As already noted, FIG. 2 shows the timed sequence of images 7-10, which are separated from each other by a time interval $\Delta t$. Images 7-10 are part of the image signal, which is transmitted digitally from the transmitter 2 to the receiver 3. The time interval thus corresponds to the inverse of the transmission frequency. If the image content, i.e., the images 7-10, recorded by the recording device 5 are being transmitted digitally, it is advisable to indicate to the user of the display device 6 or of the image-processing device 1 whether the image transmission over the transmission route 4 has been successful or faulty. The "successful" transmission of the images is understood to mean that, after the images 7-10 have been recorded by the recording device 5, they are displayed on the display device 6 after the slight delay caused by the processing and transmission operations, and that the timed sequence of the image contents of the images 7-10 remains preserved.

If an error occurs, however, such as an error in the transmission route 4 or perhaps an error during the recording by the recording device 5 itself or an error in the acquisition of the recorded input signal by the transmitter 2, changes can occur in the timed sequence of the images 7-10, or at least some of the images 7-10 are not displayed at all. In particular, it can occur in this case that one of the images 7-10 is repeated; that is, a frozen image is displayed. This happens in particular when the receiver 3 comprises the previously mentioned image buffer. Successfully transmitted images 7-10 are written to this buffer. If a defect occurs subsequently in the image transmission process, under certain conditions the image 7-10 most recently written to the buffer is repeated until it is possible for images to be transmitted successfully again. The inventive comparison of the successive images 7-10 is therefore preferably not conducted immediately after the transmission or at the end the transmission route 4, but rather only after the images have left the image buffer of the receiver 3. If, in addition or alternatively, the image buffer is assigned to the display device 6, the comparison is preferably not carried out until the images have left the image buffer and arrived in the display device 6.

The determination and visual indication of whether the image transmission has been successful or faulty is meaningful especially for medical applications, in which, for example, the person performing a treatment performs that treatment on the basis of the images 7-10 displayed on the display device 6. If the images 7-10 being shown are not current because of, for example, faulty image transmission between the transmitter 2 and the receiver 3, the treating person cannot act correctly, which could have serious consequences for the patient. For this reason, at least certain areas of the timed sequence of images 7-10 shown here are to be compared to each other after transmission, that is, in particular in the receiver 3 or in the display device 6.

The comparison is carried out in particular on a pixel-by-pixel basis. This means that the same pixels a-n of the timed sequence of images 7-10 are always compared to each other; for example, pixels a of images 7-8 are compared first, then pixels b, c, d, etc. are compared. The index (indicated by reference letters a-n) of pixels a-n has, for example, its zero point at the upper left in each image 7-10 and increases column-by-column (arrow 11) and row-by-row (arrow 12). If it is found on comparison that pixels a-n with the same index are different, that is, if at least one of the pixel values of the pixels a-n deviates, then a counter is incremented. This means that if it is found on comparison that pixels with the same index (a-n) from two different images are different, that is, if at least one of the pixel values of two pixels with the same index (a-n) deviates from the other, then a counter is incremented. The total number of pixels a-n of images 7-10 which are different is stored as a difference variable. When the comparison shows a difference, it is concluded that the image transmission has been successful. The difference variable in this case should in particular be larger than a threshold value.

When images 7-10 are being compared, special attention should be paid to the noise pattern, which is preferably different for each of the timed sequence of images 7-10, i.e., for images 7-10 which are compared to each other. This prevents the false determination of faulty image transmission even if the successive images 7-10 should happen to comprise the identical image content. This can be the case especially when the image content recorded by the recording device 5 does not change, that is, when the scene being recorded stays the same.

It is also possible, however, for the system to be set up so that the frequency at which the successive images 7-10 are recorded is slower than the display frequency or transmission frequency at which the transmitter 2 transmits the images 7-10 to the receiver 3. The transmission frequency is usually the same as the display frequency at which the transmitted images 7-10 are shown on he display device 6. If the recording frequency of the images 7-10 supplied to the transmitter 2 is slower than the transmission frequency at which the images 7-10 are transmitted, the recorded images 7-10 are stored temporarily in an image buffer (not shown) and transmitted from this image buffer by the transmitter 2 multiple times in immediate succession. For example, first the image 7 is recorded, stored temporarily in the image buffer, and then transmitted from this buffer at the transmission frequency until the image 8 has been recorded and stored temporarily in the image buffer. This procedure is continued as needed with images 8, 9, and 10.

In the case of the images 7-10 transmitted multiple times from the image buffer, both the image content and the noise pattern generated during recording are the same. If these images 7-10 are transmitted without change to the receiver 3, the fact that the images are completely identical will lead to the false conclusion that the image transmission is faulty. For this reason, it is provided that the transmitter 2 superimposes a (an additional) noise signal on the image signal. This can be done with a certain intensity, wherein in particular the intensity is selectable, is calibrated to the image signal, and/or is random within certain limits. This makes it possible, even if the image contents of images 7-10 are identical, to recognize successful image transmission, because the noise patterns contained in the images 7-10 after transmission are different from each other.

Instead of modifying the image contents of images 7-10 with a random noise pattern, an alternative possibility is to use a controlled noise pattern. For this purpose, the pixel values of images 7 and 9 are each decremented or incremented by a certain value, for example, and the pixel values of images 8 and 10 immediately following images 7 and 9 are each incremented or decremented by the same certain value.

Especially when the images 7-10 are present as gray-scale images, the intensities of the pixels a-n which were modified as described above average out when shown on the display device 6, so that the user sees only the intended image content, not the intensity variations. The display frequency and also the transmission frequency must be higher here, especially much higher, than the perception frequency of the human eye. The certain value used, furthermore, may not be too high. In the normal case, a value will be used which is considerably below the range of values for pixels a-n to be expected for the display of the image content; for example, a value of one will be used.

What is claimed is:

1. A method for operating an image-processing device, in which an image signal on which a noise signal is superimposed is digitally transmitted between a transmitter and at least one receiver, and the image signal comprises a timed sequence of images, each containing its own image content and a noise pattern of the noise signal superimposed on the image content, wherein at least certain areas of at least two successive images of the image signal are compared to each other after the transmission of the image signal to the at least one receiver, and when a difference is found between the noise patterns contained in the certain areas of the at least two successive images, it is concluded that the at least two consecutive images have been transmitted successfully even when the image content of the certain areas of the at least two successive images is identical.

2. A method according to claim 1, wherein the comparison is carried out pixel-by-pixel, and the number of pixels (a-n) of the at least two consecutive images which are different is determined as a difference variable, or pixel values of at least some of the pixels (a-n) of the at least two successive images are added and the difference between the sums is determined as the difference variable.

3. A method according to claim 1, wherein the conclusion of successful image transmission is drawn when the difference variable exceeds a constant threshold value.

4. A method according to claim 2, wherein it is concluded that a faulty image transmission has occurred when the difference variable falls below the constant threshold value, this being done in particular only when there is identical agreement between the successive images.

5. A method according to claim 1, wherein the transmitter accepts a digital input signal as the image signal, or the transmitter accepts an analog input signal and digitizes it into the image signal.

6. A method according to claim 1, wherein the noise signal arises upon the recording of the image signal by a recording device and is accepted together with the image signal by the transmitter.

7. A method according to claim 1, wherein the transmitter superimposes the noise signal on the image signal with a certain intensity, which is at least one of selectable, calibrated to the image signal, and random within certain limits.

8. A method according to claim 7, wherein the noise signal is superimposed on at least one certain pixel (a-n), which in particular is determined randomly, within the image signal.

9. A method according to claim 7, wherein when the noise signal is superimposed on the image signal, at least one pixel value of at least one pixel (a-n) is increased by a certain value in a first of the at least two successive images of the image signal and is decreased by the certain value in a second image of the at least two successive images.

10. A method according to claim 9, wherein after the comparison but before displaying on a display device, the pixel value is decreased by the certain value for the first image of the at least two successive images and increased for the second image of the at least two successive images.

11. A method according to claim 1, wherein the image signal comprises a certain image frequency before transmission and is transmitted at a transmission frequency which is higher than the image frequency, for which purpose at least one image of the image signal is transmitted multiple times from an image buffer.

12. A method according to claim 1, wherein the images which have been compared to each other succeed each other immediately, or a certain number of intermediate images lies between them.

13. A method according to claim 10, wherein successful image transmission or faulty image transmission is visually indicated to a user of the receiver.

14. A method according to claim 10, wherein displaying by the display device is stopped in the event of faulty image transmission 15. A method according to claim 7, wherein when the noise signal is superimposed on the image signal, all of pixels (a-n) are increased by a certain value in the first of the successive images of the image signal and is decreased by the same value in the second of the successive images.

16. An image-processing device comprising:
a transmitter and at least one receiver, which are designed for the digital transmission of an image signal on which a noise signal is superimposed, wherein the image signal comprises a timed sequence of images, each containing its own image content and a noise pattern of the noise signal superimposed on it, and wherein
the image-processing device is configured to compare at least certain areas of at least two successive images of the image signal to each other after the transmission of the image signal to the at least one receiver, and when a difference is found between the noise patterns contained in the certain areas of the at least two successive images, it is configured to conclude that the at least two consecutive images have been transmitted successfully even when the image content of the certain areas of the at least two successive images is identical.

* * * * *